(12) United States Patent
Donak et al.

(10) Patent No.: US 6,408,061 B1
(45) Date of Patent: Jun. 18, 2002

(54) INTERFACING A COMMUNICATION SWITCH TO A NON-EMBEDDED DEVICE DRIVER VIA A VIRTUAL DEVICE INTERFACE

(75) Inventors: John Donak, Kanata; Frank Meijer, Ottawa; Todd Dowser, Greely, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/267,005

(22) Filed: Mar. 12, 1999

(51) Int. Cl.[7] .......................... H04M 3/00; H04M 5/00; H04L 12/66; G06F 7/00
(52) U.S. Cl. .................. 379/188; 379/265.11; 370/466; 370/353; 370/401; 707/10
(58) Field of Search ................. 370/466, 353, 370/401; 707/10; 379/265, 188

(56) References Cited

U.S. PATENT DOCUMENTS 6,049,602 A  *  4/2000  Foladare et al. ............ 379/265
6,154,465 A  * 11/2000  Pickett ........................ 370/466
6,181,694 B1 *  1/2001  Pickett ........................ 370/353
6,185,565 B1 *  2/2001  Meubus et al. ............... 707/10
6,208,658 B1 *  3/2001  Pickett ........................ 370/401

\* cited by examiner

*Primary Examiner*—Ahmad F. Matar
*Assistant Examiner*—Thjuan P Knowlin
(74) *Attorney, Agent, or Firm*—Gibbons, Del Deo, Dolan, Griffinger & Vecchione

(57) ABSTRACT

A system and method for adding non-embedded network interface drivers to a communication switch with minimum impact on the switch. A proxy driver which presents the appearance of a network interface driver is embedded in the switch. An external hardware platform containing the non-embedded driver is connected to the proxy driver. The external hardware platform includes a proxy interface connected to the proxy driver. The proxy driver sends signals derived from the switch's internal interface to the proxy interface, which in turn replicates the switch's internal interface in the external hardware platform for controlling the non-embedded driver.

6 Claims, 5 Drawing Sheets

INTERFACING A COMMUNICATION SWITCH TO A NON-EMBEDDED DEVICE DRIVER VIA A VIRTUAL DEVICE INTERFACE

FIELD OF THE INVENTION

This invention pertains generally to telephone communication equipment, and more particularly to interfacing new network interface capabilities to telephone switching equipment.

BACKGROUND OF THE INVENTION

Telephone service for a small business or the like is typically provided by installing a switching unit (e.g., a Private Branch Exchange (PBX), a Key Switching Unit (KSU), etc.) at the business premises, connecting a plurality of telephone terminal devices located on the business premises to the switching unit, and connecting the switching unit to a telephone network. All of the equipment located at the telephone customer location is known generally as Customer Premises Equipment (CPE).

The switching unit typically includes drivers for interfacing services available on the telephone network to the local terminal devices, an example of which is shown in FIG. 1. A CPE switching unit 1 has a plurality of CPE terminals 2 connected into the switching unit's switching fabric 3. Switching fabric 3 connects the terminals 2 to communication networks by means well known in the art and not shown. Switching unit 1 connects via a network interface communication channel 4 to network interface 5 which interfaces to network 6. Network 6 might be the Public Switched Telephone Network (PSTN), in which case network interface 5 might consist of switching equipment at the telephone company central office. The exemplary switching unit I includes a network interface template 12, which is an abstraction layer specifying the functional intelligence related to network interface communication channel 4. The abstraction layer contained in network interface template 12 should be substantially independent of the actual hardware interface. Network interface driver 14 interfaces CPE switching unit 1 with network interface communication channel 4. Network interface driver 14 is informed by network interface template 12 as to the capabilities of network interface communication channel 4, and for this purpose communicates with network interface 12 by means of interface 13. Network interface template 12 and network interface driver 14 typically are heavily software-implemented, and therefore interface 13 typically comprise shared memory areas or data transfers internal to the platform on which network interface template 12 and network interface driver 14 are resident. To make the abstraction layer represented by network interface template 12 substantially independent of network interface hardware, interface 13 is an abstracting layer, signalling network interface driver 14's hardware-related functions according to the abstract definitions of those functions conveyed by network interface template 12.

As new services become available on telephone networks or as it is desired to provide new services to users, appropriate drivers must be interfaced to the switching unit accordingly. Building a new driver into the switching unit (e.g., an "embedded driver") necessitates a new design of the switching unit, which requires a long lead time for design and manufacturing. Also, it may be desired to provide a new service through an existing switching unit.

There is thus a need for interfacing non-embedded drivers (i.e., drivers resident on external platforms) to communication switching units.

Accordingly it is an object of the present invention to provide improved methods and systems for interfacing non-embedded drivers to communication switching units.

It is another object of the present invention to provide methods and system for interfacing non-embedded drivers to communication switching units while isolating the driver from hardware details of the switching units.

It is another object of the present invention to foster an open architecture for communication switching units wherein third-party vendors may develop new drivers.

These and other objects of the invention will become apparent to those skilled in the art from the following description thereof.

SUMMARY OF THE INVENTION

In accordance with the teachings of the present invention, these and other objects may be accomplished by the present systems and methods of adding non-embedded network interface drivers to a telephone communication switch while minimizing impact on the switch. A proxy driver which presents the appearance of a network interface driver is embedded in the switch. An external hardware platform containing the non-embedded driver is connected to the proxy driver. The external hardware platform includes a proxy interface coupled to the proxy driver. The proxy driver communicates with the switch's internal network intelligence via a virtual device interface, and sends signals derived from the virtual device interface to the proxy interface, which in turn replicates the switch's virtual device interface in the external hardware platform. The replicate in the external platform of the switch's virtual device interface permits the non-embedded driver to interface closely with internal network intelligence of the switch despite being isolated from hardware details of the switch thus fostering an open architecture for non-embedded drivers.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

Embodiments of the present invention are illustrated in terms of adding a feature (specifically, VoIP, also known as H.323 protocol) to a CPE switching unit of a telephone network by providing appropriate drivers and other necessary functions on a separate platform external to the CPE switching unit. The use of an external platform obviates redesigning the CPE switching unit and permits the VoIP feature to be retrofitted to existing CPE switching units.

Those skilled in the art will apprehend application of the invention to networks other than telephone networks.

Figure 1:
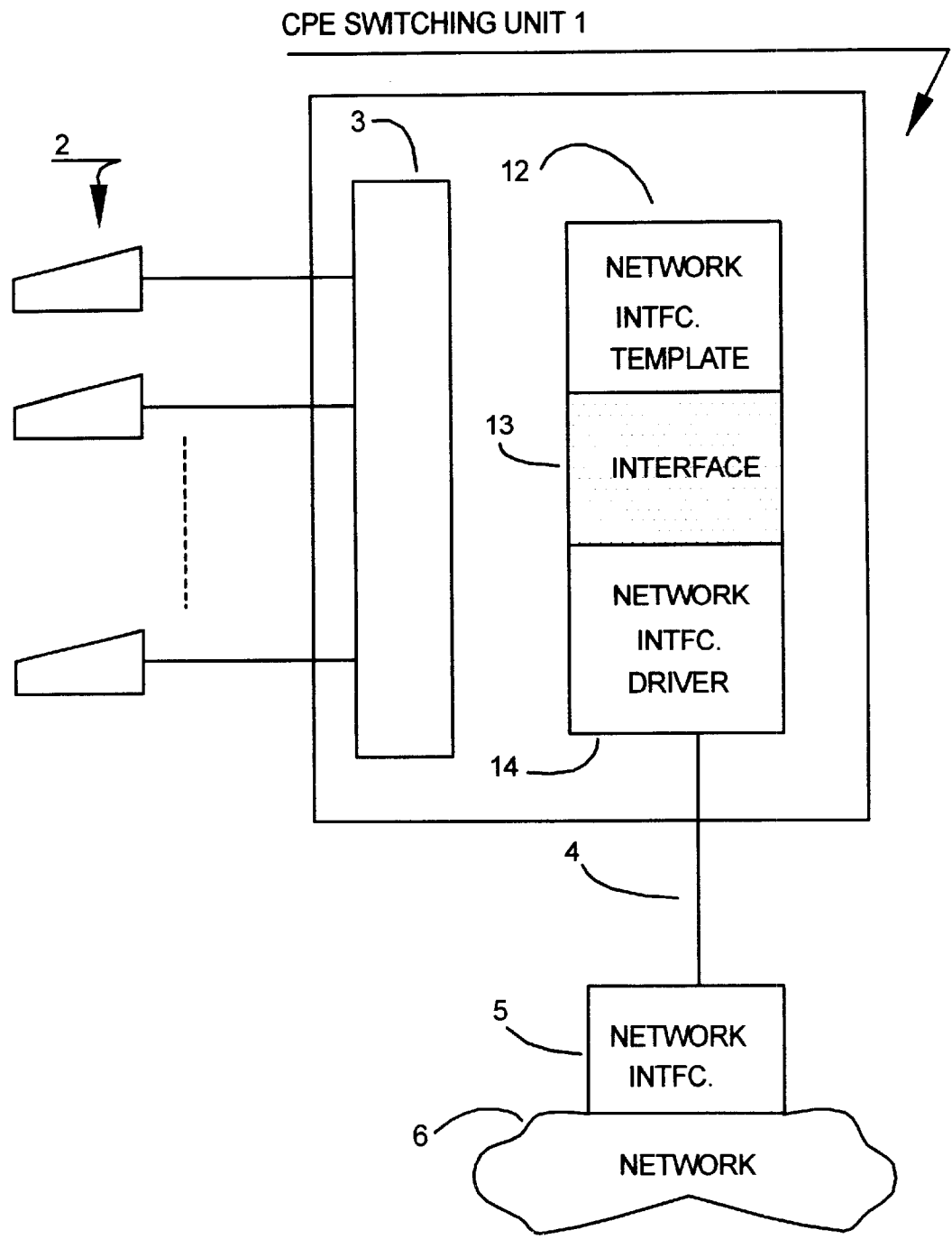
FIG. 1 depicts conventional interfacing of a driver to a CPE switching unit and to the network interface of a telephone network.
Figure 2:
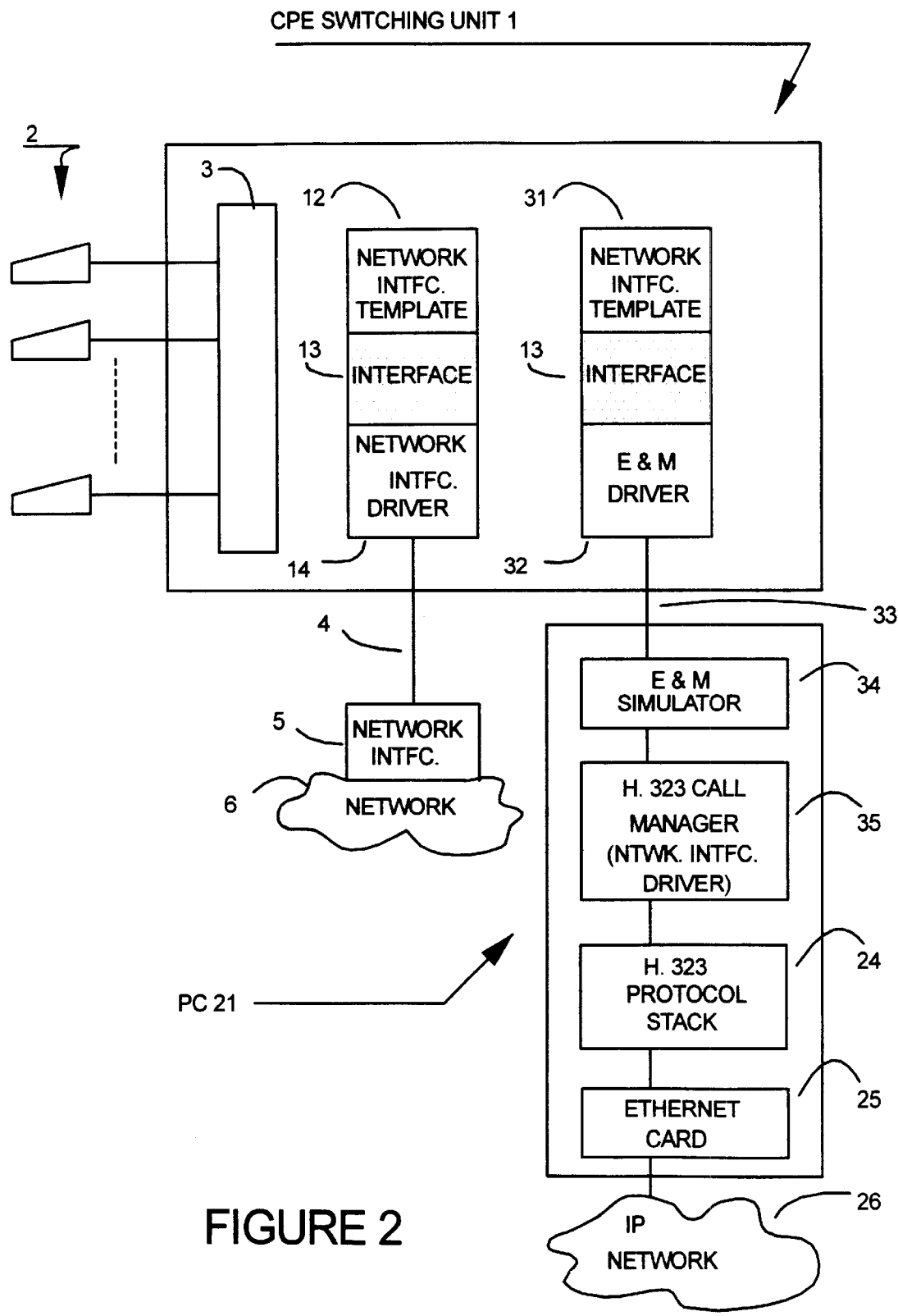
FIG. 2 depicts the CPE switching unit further embodying VoIP (Voice over Internet Protocol) capability provided according to an embodiment of the invention.

FIG. 2 illustrates a personal computer (PC) 21 being used as the external platform to a conventional CPE switch such as that shown in FIG. 1. Those skilled in the art realize that platforms other than a PC could be used as the external platform. The elements contained in the external platform PC 21 appear to CPE switching unit 1 as a network interface functioning in E&M protocol. CPE switching unit 1 includes an E&M network interface driver 32, informed by network interface template 31 via an interface 13 of the capabilities of the E&M network interface. E&M driver 32 communicates with PC 21 via an interface line 33. PC 21 receives communications from interface line 33 at E&M simulator 34, a software construct which interprets commands in the E&M signalling format and translates them into appropriate commands for H.323 call manager 35. Communication from E&M simulator 34 to H.323 call manager 35 may be in Q.931 protocol. H.323 call manager 35 serves as a network interface driver, and directs H.323 protocol stack 24, which in this embodiment is purchased from RADVision™, but may be procured from other sources as well. H.323 protocol stack 24 communicates with a standard Ethernet card 25, which interfaces to an Internet Protocol (IP) network 26. The embodiment depicted in FIG. 2 does not require changes in CPE switching unit 1, but is limited to functions available in E&M signalling and requires the development of E&M simulator 34 which can be quite complex if a large number of VoIP features are desired.

Figure 3:
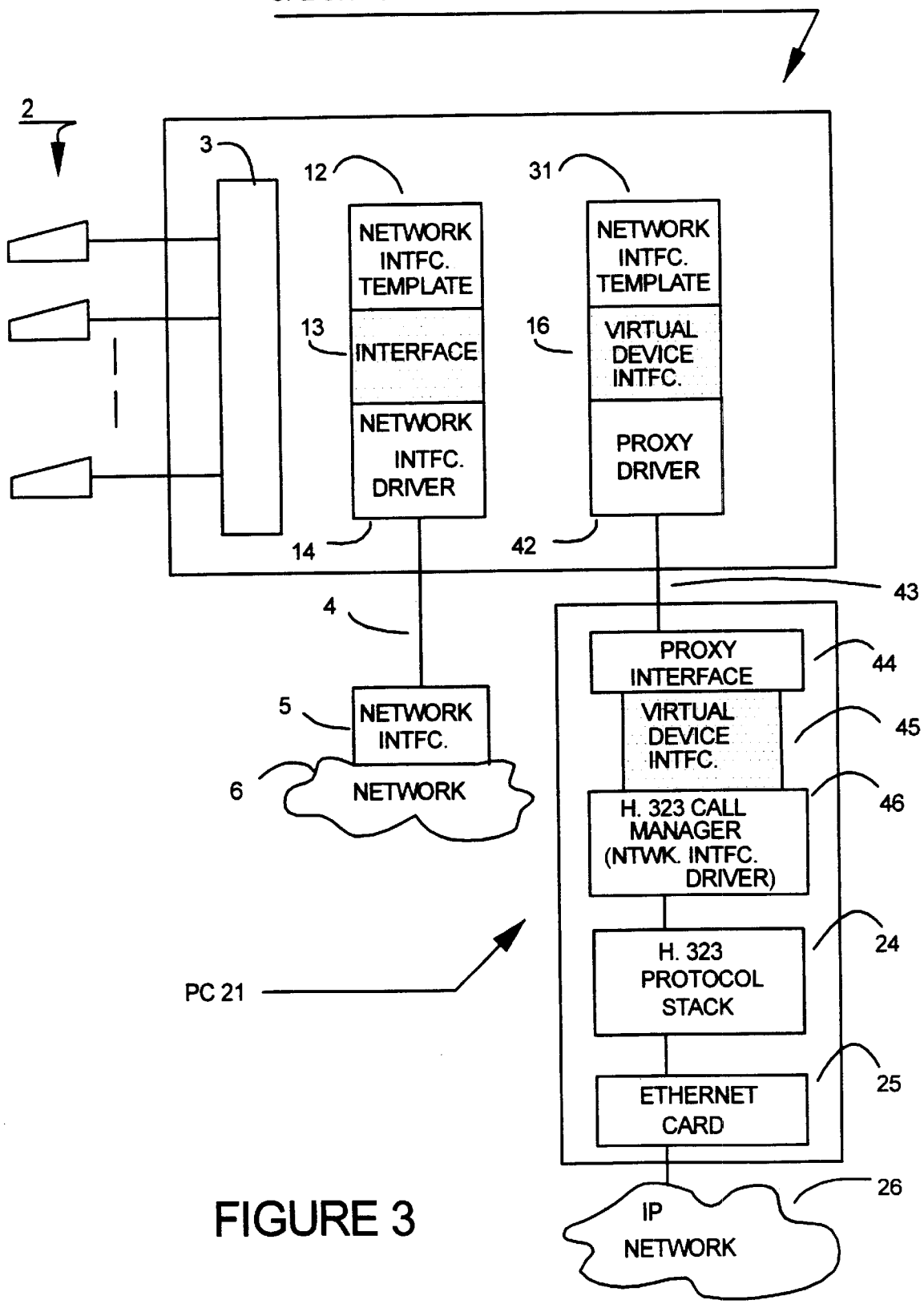
FIG. 3 depicts the CPE switching unit embodying VoIP capability according to another embodiment of the invention.

Another embodiment is depicted in FIG. 3. An H.323 call manager 46 is provided in PC 21, which communicates as in FIG. 2 with an IP network 26 via H.323 protocol stack 24 and Ethernet card 25. Since H.323 call manager 46 appears as a network interface driver, functionally comparable to network interface driver 14 although more complex so that it may handle VoIP in the present example, it is desirable to communicate directly with H.323 call manager 46 by means of an interface having the functional capabilities of interface 13. The present invention replaces interface 13, which is dependent on the hardware details of CPE switching unit 1, with virtual device interface 16 which is an open-architecture functional equivalent. This enables any driver which may be made responsive to virtual device interface 16 to be interposed in place of a network interface driver in CPE switching unit 1. Those skilled in the art will realize that any occurrences of interface 13 may be replaced by virtual device interface 16 provided that a network interface template compatible with it (such as 31) and a driver compatible with it (such as 42) are also employed.

To accomplish the accommodation of a network interface driver on a separate platform 21, proxy driver 42 is thus interposed in CPE switching unit 1 and proxy interface 44 is provided in PC 21, with communication between proxy driver 42 and proxy interface 44 by means of an interface line 43. Proxy driver 42 appears as a network interface driver to the rest of CPE switching unit 1, and thus it responds directly to virtual device interface 16. Proxy interface 44 creates virtual device interface 45 based upon information received from proxy driver 42. Virtual device interface 45 is a local replica of virtual device interface 16. Proxy interface 44 presents virtual device interface 45 to H.323 call manager 46, and thereby to the rest of PC 21. The details of interface line 43 are abstracted from both network interface template 31 and H.323 call manager 46 by virtual device interface 45, which performs abstracting as noted in connection with virtual device interface 16. The invention, though described in terms of the particular example of adding VoIP capabilities on an Internet Protocol network, is not limited thereto and may be practiced for a wide variety of interface connections 43, and for a wide variety of communication media and networks, features, and protocols, given appropriate network interface templates 31 and network interface drivers 46.

Under the present invention, new non-embedded network interface drivers (such as 46) may be added with minimal changes to the internals of CPE switch 1. Existing non-embedded network interface drivers (such as 46) may be easily upgraded to benefit from any new functionality added to network interface templates (such as 31). An open architecture is thus fostered and "letting out" the design and construction of network interface drivers (such as 46) to third-party vendors is simplified.

Proxy driver 42 performs the following functions in the illustrative embodiment:

Communicate with appropriate entities within CPE switching unit 1, including virtual device interface 16;

Accept requests from virtual device interface 16 and deliver them to proxy interface 44;

Receive messages from proxy interface 44 and deliver them to virtual device interface 16; and Handle the connection protocol over interface line 43.

Proxy interface 44 handles the following functions in the illustrative embodiment:

Accept registrations from external drivers (e.g., H.323 call manager 46);

Handle initialization and maintenance (e.g., enable/disable) of external drivers;

Accept virtual device interface 45 messages and deliver them to proxy driver 42;

Receive virtual device interface 16 messages from proxy driver 42 and deliver them to virtual device interface 45 for presentation to the external driver; and Handle the connection protocol over interface line 43.

Those skilled in the art will realize that the functions performed are not limited by these lists, which may be adapted for alternative embodiments. The messages that proxy interface 44 sends over virtual device interface 45 to H.323 call manager 46 in the present embodiment include a command field and a field containing a value designating a telephone network trunk, which is necessary in cases where call manager 46 manages more than one. Each message may also include one or more parameter values. The messages that proxy interface 44 sends over virtual device interface 45 to H.323 call manager 46 are summarized in Table 1.

TABLE 1

| Command Field | Command Name | Parameters/(Comments) |
| --- | --- | --- |
| 114 | VDI_EXT_DRIVER | 0 (Reset) |
| | | 1, route specifier (Enable) |
| | | 2 (Query Sanity) |
| 57 | VDI_ALERT | (Indicates that local party is alerting) |
| 110 | VDI_CALLING_NAME | Name length, calling party's name (outgoing call) |
| 70 | VDI_CLID | Calling party's ID and blocking info (outgoing call) |
| 54 | VDI_SEIZE | (Marks start of a trunk seize on outgoing call) |
| 1 | VLI_ANSWER | (Indicates local party has answered call) |

TABLE 1-continued

| Command Field | Command Name | Parameters/(Comments) |
|---|---|---|
| 3 | VLI_DIAL | No. of digits, string of digits of destination number to dial |
| 2 | VLI_RELEASE | Code indicating reason for release of a call |
| 0 | VLI_SEIZE | |

The messages passed from H.323 call manager 46 over virtual device interface 45 to proxy interface 44 in the present embodiment include a field specifying message type as STIM messages, an identifier of a telephone network trunk (necessary if call manager 46 is managing more than one), a command field, an indication of the message length, and a route identifier. The route identifier is the one that was sent to call manager 46 in the VDI_EXT_DRIVER Enable command listed in Table 1. Each message may also include one or more parameter values. The messages passed from H.323 call manager 46 over virtual device interface 45 to proxy interface 44 are summarized in Table 2.

TABLE 2

| Command Field | Command Name | Parameters/(Comments) |
|---|---|---|
| 107 | VD_EXT_DRVR | 3, B-channel identifier (Instructs to register a trunk) 4 (Instructs to deregister a trunk) 5 (Acknowledges reinitializing of a trunk) |
| 8 | FAR_END_EVENT | 7 (Indicates that channel is busy) 2, channel-ID (Indicates far-end has answered) 5 (Indicates far end blocked) 1 (Indicates trunk released, or is answer to VLI_RELEASE) 11 (Indicates far ringback) 0 (Indicates end of incoming call presentation) 6 (Indicates trunk unblocked, may be used again) |
| 17 | NI_CLID | No. of digits, string of digits (calling number on incoming call) |
| 104 | NI_CONNECTED_NAME | String of characters (name of connected party on outgoing call) |
| 22 | NI_NAME | String of characters (name of calling party on incoming call) |
| 53 | NI_TLI | No. of digits, string of digits (number of connected party on outgoing call) |
| 54 | RLS_DISP | String of characters (stating reason for release) |
| 87 | VD_CAUSE | Code indicating reason for release |
| 97 | VD_MSGDONE | 1 (Follows FAR_END_EVENT, 1) |
| 48 | VL_MULTI_DIGIT | No. of digits, string of digits, blocking info (calling number on incoming call) |
| 12 | VLR_NACK_SEIZE | 0, 2 (Negative acknowledgement to VDI_SEIZE) |

Those skilled in the art will realize that the sets of command messages given in Table 1 and Table 2 are representative and are subject to modification and evolution.

Figure 4:
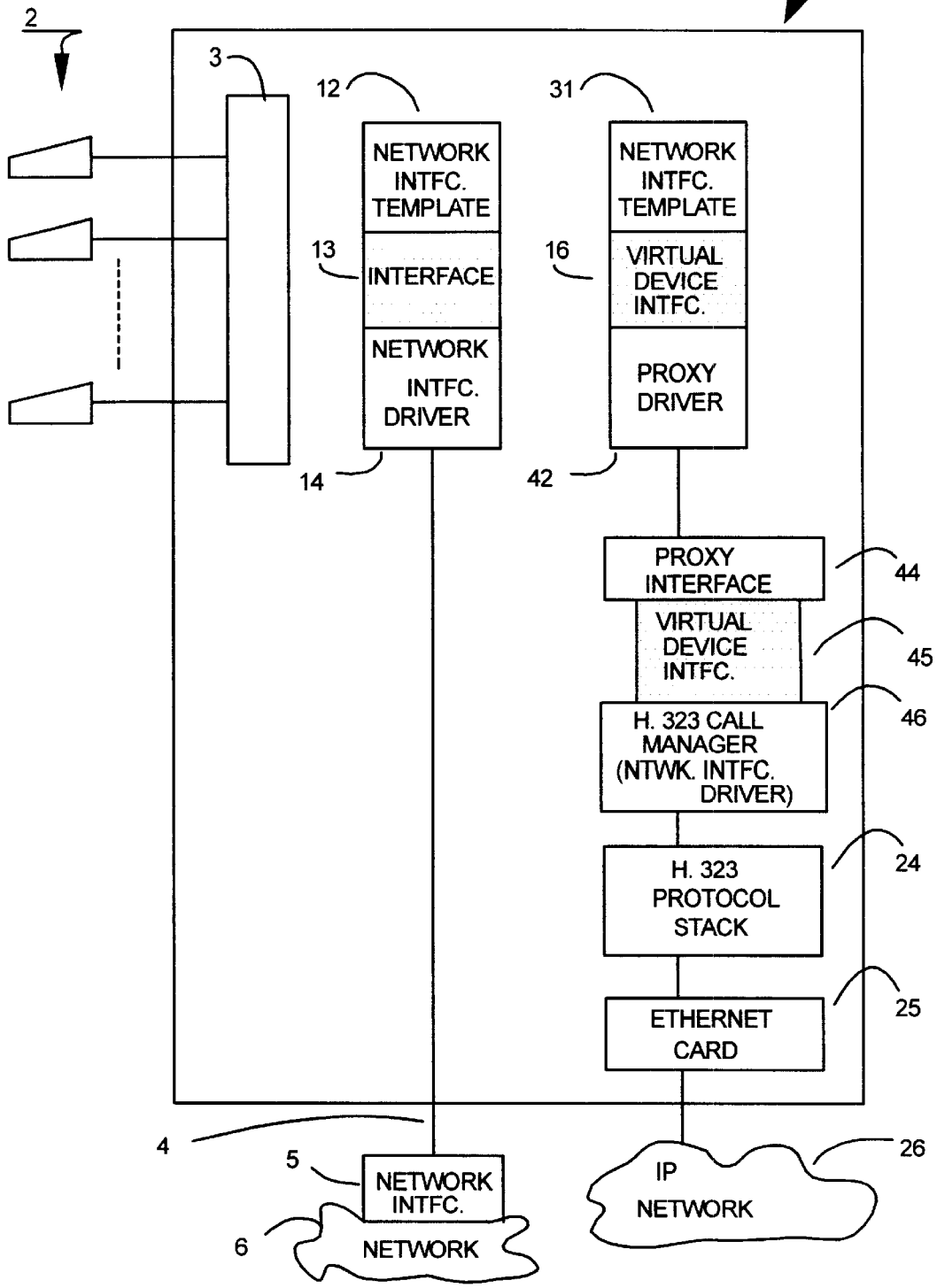
FIG. 4 depicts the embodiment as in FIG. 3 in a single hardware platform.

The network interface template (such as 31) and the virtual device interface 16 are independent of the actual implementation of CPE switching unit 1. Though embedded in a closed platform in the present embodiment, in an alternative embodiment some components CPE switching unit 1 of FIG. 3 (for example) may exist on the same hardware platform 50 as non-embedded driver 46, as shown in FIG. 4. Advantages still flow from providing proxy driver 42, proxy interface 44, and replica virtual device interface 45: The addition of network interface drivers such as H.323 call manager 46 is facilitated since the internal details of it are hidden from the CPE switching components, and details of CPE switching components are hidden from the non-embedded network interface driver. The use of the external replica virtual device interface 45 makes this latitude possible without impact on the non-embedded network interface driver (such as 46). Those skilled in the art will realize that collocating proxy driver 42 and proxy interface 44 on the same platform simplifies the operation of both.

Figure 5:
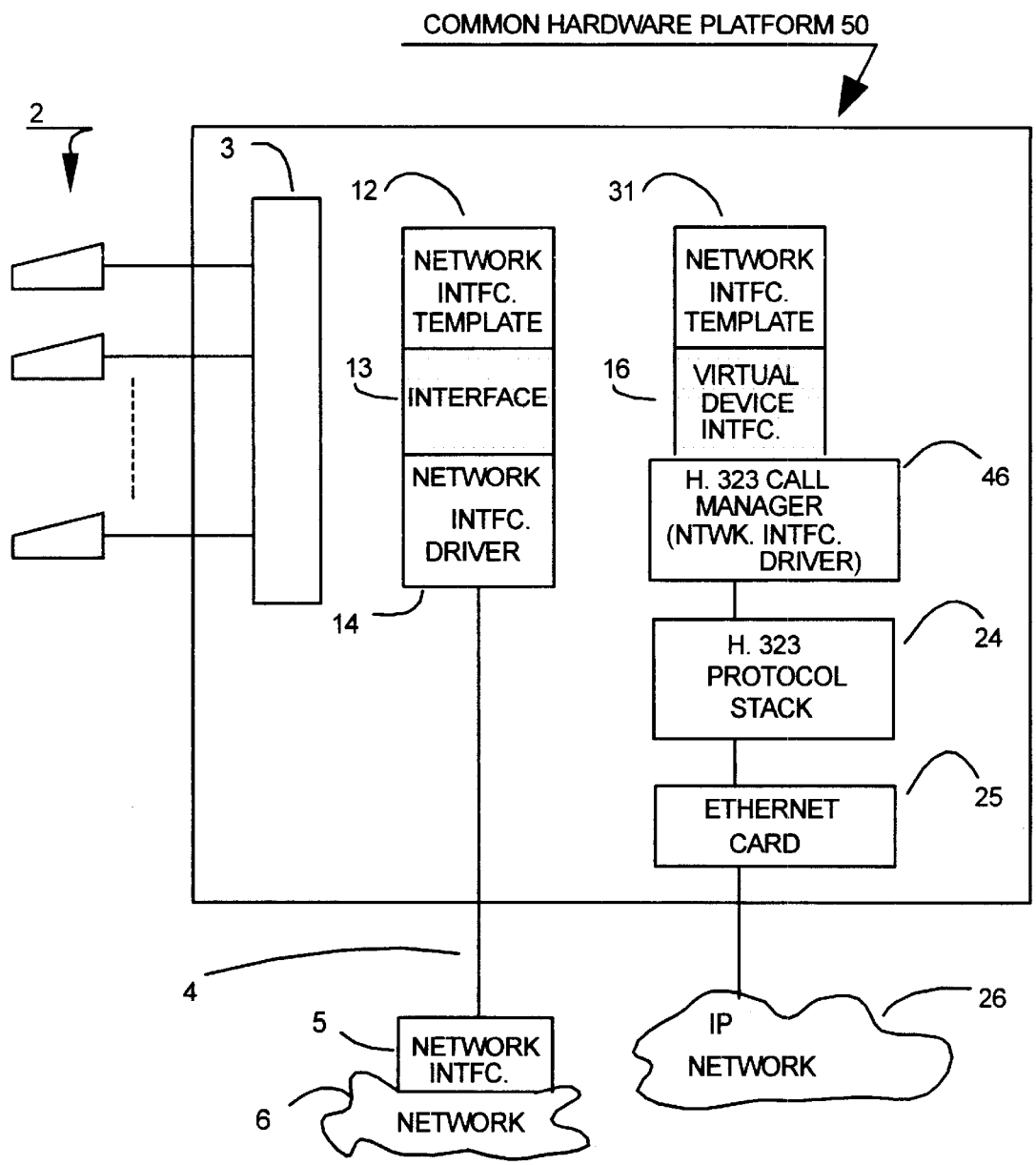
FIG. 5 depicts an alternative embodiment of the invention in a single hardware platform.

FIG. 5 depicts another embodiment, with call manager 46 communicating directly with network interface template 31 via virtual device interface 16, without creating a replica of virtual device interface 16. This is made possible by the existence of virtual device interface 16 as an open-architecture interface, as opposed to hardware-specific interface 13 of conventional architectures. Call manager 46 is still considered a non-embedded driver although resident in the same platform by virtue of being responsive to an open-architecture interface and susceptible of being replaced by plug-in drivers responsive to the same interface but for performing other functions or communicating on other kinds of networks.

It will thus be seen that the invention efficiently attains the objects set forth above, among those made apparent from the preceding description. In particular, the invention provides a system for adding non-embedded drivers to a communication switch with minimal impact on the switch. Those skilled in the art will appreciate that the configurations depicted in FIGS. 2, 3, 4, and 5 and their supporting discussion in the specification provide addition of a non-embedded driver meeting these objects.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. Apparatus for adding a non-embedded network interface driver to a communication switch wherein the switch is for selectably switching a plurality of communication terminals into communication with one or more communication networks, wherein the switch comprises:

a network interface driver associated with each network;

a network interface template in communication with each said network interface driver wherein each said network interface template stores information regarding its associated network; and a virtual device interface coupled between each said network interface template and its associated network interface driver wherein each said network interface template and each said associated network interface driver communicate through an associated virtual device interface, and wherein the apparatus comprises:
- a proxy driver coupled to said virtual device interface, wherein said proxy driver appears to the switch as the network interface driver to be added; and,
- a proxy interface connected to said proxy driver and responsive to said proxy driver for presenting a replica virtual device interface;
- said non-embedded driver connected to and responsive to said replica virtual device interface.

2. The apparatus recited in claim 1 wherein:
- said network interface driver, said network interface template, said virtual device interface, and said proxy driver are located in a first hardware platform;
- said proxy interface, said replica virtual device interface, and said non-embedded network interface driver are located in a second hardware platform; and
- said proxy driver and said proxy interface are connected by an inter-platform connection.

3. A method of adding a non-embedded network interface driver to a communication switch wherein the switch is for selectably switching a plurality of telephone terminals into communication with one or more telephone networks, wherein the switch comprises:
- a network interface driver associated with each network;
- a network interface template in communication with said network interface driver wherein each said network interface template stores information regarding its associated network; and
- a virtual device interface coupled between each said network interface template and its associated network interface driver wherein each said network interface template and each said associated network interface driver communicate through an associated virtual device interface, and wherein the method comprises:
- coupling a proxy driver to said virtual device interface wherein the proxy driver appears to the switch as the network interface driver to be added;
- connecting a proxy interface to said proxy driver wherein said proxy interface is responsive to said proxy driver for presenting a replica virtual device interface;
- connecting said non-embedded driver to said proxy interface wherein said non-embedded driver is responsive to said replica virtual device interface.

4. The method recited in claim 3 wherein:
- said network interface driver, said network interface template, said virtual device interface, and said proxy driver are located in a first hardware platform;
- said proxy interface, said replica virtual device interface, and said non-embedded network interface driver are located in a second hardware platform; and
- the method further comprises connecting said proxy driver and said proxy interface by an inter-platform connection.

5. A communication switch for selectably switching a plurality of communication terminals into communication with one or more communication networks, wherein the switch comprises:
- a network interface template associated with a network and storing information regarding its associated network;
- an open-architecture virtual device interface coupled to said network interface template; and;
- an open-architecture network interface driver coupled to said virtual device interface for communicating with said network according to information stored by said network interface template,
- whereby network interface drivers are isolated from hardware details of the switch.

6. In a communication switch for selectably switching a plurality of communication terminals into communication with one or more communication networks, wherein the switch comprises a network interface template associated with a network and storing information regarding its associated network,
- a method of providing network interface drivers isolated from hardware details of the switch comprising:
  - coupling an open-architecture virtual device interface to said network interface template; and
  - coupling an open-architecture network interface driver to said virtual device interface for communicating with said network according to information stored by said network interface template.

* * * * *